(12) United States Patent
Chen et al.

(10) Patent No.: US 10,962,409 B2
(45) Date of Patent: Mar. 30, 2021

(54) METHOD AND SYSTEM FOR MEASURING ORBITAL ANGULAR MOMENTUM MODES OF PHOTONS BASED ON SPIRAL TRANSFORMATION

(71) Applicant: SUN YAT-SEN UNIVERSITY, Guangdong (CN)

(72) Inventors: Yujie Chen, Guangdong (CN); Yuanhui Wen, Guangdong (CN); Ioannis Chremmos, Guangdong (CN); Siyuan Yu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 16/613,804

(22) PCT Filed: Apr. 23, 2018

(86) PCT No.: PCT/CN2018/084061
§ 371 (c)(1),
(2) Date: Nov. 15, 2019

(87) PCT Pub. No.: WO2019/204960
PCT Pub. Date: Oct. 31, 2019

(65) Prior Publication Data
US 2020/0173844 A1    Jun. 4, 2020

(51) Int. Cl.
*H04J 14/04* (2006.01)
*G01J 1/42* (2006.01)

(52) U.S. Cl.
CPC .............. *G01J 1/42* (2013.01); *H04J 14/04* (2013.01)

(58) Field of Classification Search
CPC .............. G01J 1/42; H04B 10/60; H04J 14/04
(Continued)

(56) References Cited

U.S. PATENT DOCUMENTS

| | | | |
|---|---|---|---|
| 10,154,253 B2 * | 12/2018 | Smithwick | ............. G02B 30/24 |
| 2016/0028479 A1 | 1/2016 | Ren et al. | |
| 2017/0353241 A1 | 12/2017 | Fazal et al. | |

FOREIGN PATENT DOCUMENTS

| | | |
|---|---|---|
| CN | 103713443 | 4/2014 |
| CN | 104121996 | 10/2014 |

(Continued)

OTHER PUBLICATIONS

"International Search Report (Form PCT/ISA/210) of PCT/CN2018/084061," dated Jan. 22, 2019, with English translation thereof, pp. 1-5.

*Primary Examiner* — Que Tan Le

(74) *Attorney, Agent, or Firm* — JCIPRNET

(57) ABSTRACT

The invention discloses a method and system for measuring orbital angular momentum modes of photons based on spiral transformation. A phase plate located in an input plane transforms the incident beam along a spiral path in the input plane into a straight line in an output plane and a phase plate located in the output plane compensate the phase accumulated when the beam propagates from the input plane to the output plane during the above transformation process, thereby realizing that the orbital angular momentum modes of photons to be measured in the input plane are transformed into plane wave modes with specific tilted wavefronts in the output plane. The plane wave modes with different tilted wavefronts can be focused on different positions on the focal plane and thus realize one-to-one mapping and detection between orbital angular momentum modes of photons and spatial locations.

14 Claims, 3 Drawing Sheets

(58) Field of Classification Search
USPC .................................. 250/214.1, 214 R, 216
See application file for complete search history.

(56) References Cited

FOREIGN PATENT DOCUMENTS

| CN | 106289526 | 1/2017 |
| CN | 106533574 | 3/2017 |
| CN | 108923880 | 11/2018 |

* cited by examiner

METHOD AND SYSTEM FOR MEASURING ORBITAL ANGULAR MOMENTUM MODES OF PHOTONS BASED ON SPIRAL TRANSFORMATION

CROSS-REFERENCE TO RELATED APPLICATION

This application is a 371 of international application of PCT application serial no. PCT/CN2018/084061, filed on Apr. 23, 2018. The entirety of the above mentioned patent application is hereby incorporated by reference herein and made a part of this specification.

TECHNICAL FIELD

The present invention relates to the field of spatial mode division multiplexing/demultiplexing of optical communication applications, and more particularly to a method and system for measuring orbital angular momentum modes of photons based on spiral transformation.

BACKGROUND TECHNIQUE

With the development of information technologies with the Internet as the core including the Mobile Internet, Internet of Things, cloud computing, big data, etc., the rapid expansion of information has placed great demands on the information transmission capacity of optical communication systems. In view of the fact that the current channel multiplexing technology including wavelength division multiplexing, time division multiplexing and polarization multiplexing has brought the communication capacity up to the limit, mode division multiplexing in the space domain has become one of the most important research directions in the field of communication as it is promising to again greatly improved the communication capacity. Mode division multiplexing in the space domain exploits orthogonal spatial modes of beams as independent channels for signal transmission, thereby greatly improving the transmission capacity of the communication system. One of the mode division multiplexing solutions that have received widespread attention in recent years is based on a vortex beam carrying orbital angular momentum (OAM). The idea of using a vortex beam for optical communication was first proposed in 2004. Subsequent large-capacity communication experiments based on OAM mode multiplexing were successively demonstrated in both free-space optical communication systems and fiber-optic communication systems. However, the promotion of this OAM communication system to practical use still relies on the development of more integrated and efficient OAM generation, multiplexing, transmission, demultiplexing and detection techniques.

The OAM demultiplexer is one of the core devices in the OAM communication system. Its function is to spatially separate the coaxially-propagating different OAM modes, so that different OAM modes and the information they carry can be processed and detected without interference. At present, there are some representative OAM demultiplexing methods including: (1) interference methods, such as using a pair of dove prisms to efficiently (in theory close to 100%) separate parity OAM mode. However, for further separation of all different OAM modes, it is necessary to cascade a plurality of optical components, making the whole system very complicated; (2) holography, which uses a specially designed diffraction grating in the hologram to convert different OAM modes into Gaussian modes at different diffraction orders. Since only one phase hologram is required, this scheme is thus the simplest to implement, but the disadvantage is that the theoretical upper limit of the demultiplexing efficiency is only 1/N, where N is the number of OAM modes to be sorted, that is, the demultiplexing efficiency decreases as the number of OAM modes to be demultiplexed increases and therefore is less scalable; (3) photonic integrated circuits, such as coupling the spatial vortex beam into the waveguide through the grating coupler and then converting the spiral phase into a linear phase through the arrayed waveguide grating, which can be eventually coupled to different output waveguides. The photonic integrated circuits have the advantage of being an on-chip OAM demultiplexer to facilitate large-scale integration, but it is difficult to fabricate due to the complexity of the device and the demultiplexing efficiency is also very low due to the limited light-receiving area.

In contrast, the OAM mode demultiplexing solution based on optical coordinate transformation has the advantages of high demultiplexing efficiency (100% theoretically) and relatively easy implementation (only two phase plates are required), which makes it one of the extremely important and the most promising demultiplexing options at present. The log-polar transformation is the well-known optical coordinate transformation which is the only one that can be used to realize OAM demultiplexing. Its principle is to transform the angular spiral phase of the OAM mode into a transverse linear phase, corresponding to plane wave modes with different tilted wavefronts, and the different modes can be focused on different positions on the focal plane of a convex lens and thus realize mode separation. However, since this transformation solution expands the beam along a closed circular path, breaking the characteristic of the angular infinite loop, the demultiplexed OAM modes are spatially broadened, resulting in significant overlap in between and thus crosstalk between the adjacent modes.

SUMMARY OF THE INVENTION

To solve the limitations of the existing log-polar transformation solution, the present invention proposes a new optical coordinate transformation solution for OAM mode demultiplexing. In contrast to the existing log-polar transformation that transforms the angular phase of the OAM mode along a closed circular path into a linear phase, the present invention performs a beam transformation along a spiral path, and thus more phase excursion can be extracted from the wavefront of the OAM mode, and theoretically only limited by the size of the OAM light spot, so that it can overcome the problem of adjacent mode crosstalk caused by the broadening of the sorted OAM light spot. This new optical transformation solution can separate OAM modes of photons with higher resolution compared with the existing log-polar transformation solution while maintaining high demultiplexing efficiency, and therefore has greater application potential.

In order to solve the above technical problem, the technical solution of the present invention is as follows:

A system for measuring orbital angular momentum modes of photons based on spiral transformation, includes an optical coordinate transformation module, a Fourier transformation module and a light intensity detection module, wherein the optical coordinate transformation module includes two phase plates having a beam phase modulation function, and the two phase plates are defined as a phase plate 1 and a phase plate 2, respectively;

the Fourier transformation module includes a convex lens, and a beam at a front focal plane and a back focal plane of the convex lens satisfies a Fourier transformation relationship;

the light intensity detection module is used to acquire information of light intensity distribution.

In a preferred solution, the phase plate is a spatial light modulator or a diffractive optical element or a metasurface or the like.

In a preferred solution, the two phase plates are located on two opposite surfaces of a substrate, and the two opposite surfaces of the substrate are respectively defined as a plane (x, y) for the phase plate 1 and a plane (u, v) for the phase plate 2, and the thickness of the substrate is d; the convex lens of the Fourier transformation module and the plane (u, v) of the phase plate 2 are parallel to each other, and the plane (u, v) of the phase plate 2 corresponds to the front focal plane of the convex lens; a plane where the light intensity detection module is located corresponds to the back focal plane of the convex lens.

In a preferred solution, the light intensity detection module is constituted by a camera, and the information of light intensity distribution is acquired by taking an image.

In a preferred solution, the light intensity detection module is constituted by an optical fiber array, and the information of light intensity distribution is acquired by coupling into different optical fibers.

A method for measuring orbital angular momentum modes of photons based on spiral transformation, the method includes the following steps:

S1: incidenting an incident vortex beam carrying orbital angular momentum of photons to be measured on a phase plate 1 located in a plane (x, y) vertically, and a center of the beam to be measured aligning with a center of the phase plate, wherein the wavefront of the incident vortex beam is a spiral phase $\exp(il\theta)$, where l is a topological charge, $\theta$ is the azimuthal angle and i is an imaginary unit;

S2: loading a predetermined first phase modulation Q(x, y) on the phase plate 1 located in the plane (x, y) so that the incident vortex beam propagates to a phase plate 2 located in a plane (u, v) after being modulated by the phase plate 1;

the first phase modulation Q(x, y) in this step transforms an original ring-shape distribution of the light intensity in the plane (x, y) into a rectangular distribution, which is realized by the optical spiral transformation, that is decomposing the beam in the plane (x, y) along a spiral path and then mapping into a straight line (u=const) in the plane (u, v);

S3: loading a predetermined second phase modulation P(u, v) on the phase plate 2 located in the plane (u, v), so that the phase distribution of the incident vortex beam is transformed from the angular spiral phase $\exp(il\theta)$ into a transverse linear phase $$\exp\left(\frac{ilv}{\beta}\right),$$

where $\beta$ is a scaling factor;

in the above mapping process, the optical paths of the beam propagating from different positions on the plane (x, y) to corresponding positions on the plane (u, v) are different, and thus the beam on the plane (u, v) will have phase distortion; therefore, it is necessary to load another predetermined phase modulation P(u, v) on the phase plate 2 located in the plane (u, v) to compensate this phase distortion; after phase compensation, the phase distribution of the beam is transformed from the angular spiral phase $\exp(il\theta)$ to the transverse linear phase $$\exp\left(\frac{ilv}{\beta}\right);$$

thus, the optical orbital angular momentum modes with different topological charges l are converted into plane wave modes with different tilted wavefronts after the transformation performed by the above two phase plates, and the tilted angle is proportional to l;

S4: passing the incident vortex beam after the second phase modulation P(u, v) through a convex lens, wherein due to the transverse linear phase after transformation, the incident vortex beam will be focused into a transverse position m in a back focal plane of the convex lens, and the beam in the front and the back focal plane satisfies Fourier transformation relationship so that m is expressed by the following formula:

$$m = \frac{\lambda f}{2\pi\beta} \cdot l$$

where $\lambda$ is a wavelength of the light wave and f is a focal length of the convex lens;

wherein this step focuses the transformed plane wave modes with different tilted angles into specific transverse positions and the transverse position is proportional to the topological charge of the orbital angular momentum mode of photons, thus realizing one-to-one mapping between different orbital angular momentum modes of photons and different spatial locations;

S5: recording a position of the light intensity distribution through a light intensity detection module in the back focal plane of the lens and determining the topological charge l of the orbital angular momentum mode of photons of the beam to be measured.

In a preferred embodiment, the beam in the plane (x, y) in S2 is decomposed along a path of a logarithmic spiral and mapped to a straight line in the plane (u, v); a corresponding mapping relationship of coordinates is expressed by the following formula:

$$u(r,\theta) = \frac{\beta}{1+a^2}\left[a \cdot \ln\left(\frac{r}{r_0}\right) + \theta\right], \; v(r,\theta) = \frac{\beta}{1+a^2}\left[\ln\left(\frac{r}{r_0}\right) - a \cdot \theta\right]$$

where a and $r_0$ are related parameters of a logarithmic spiral transformation, in which $r_0$ represents a position information in the plane (x, y) mapped to an origin of the plane (u, v); and a represents a growth rate of the logarithmic spiral, a=0 corresponds to the case that the logarithmic spiral transformation deteriorates into a log-polar transformation, and (r, $\theta$) are the spiral-polar coordinates of the plane (x, y).

In a preferred embodiment, (r, θ) is expressed by the following formula:

$$r = (x^2+y^2)^{\frac{1}{2}}, \theta = \theta_0 + 2m\pi, \theta_0 = \tan^{-1}\left(\frac{y}{x}\right), m = \left\lfloor \frac{1}{2\pi a}\ln\left(\frac{r}{r_0}e^{-2a\theta_0}\right)\right\rfloor$$

where $\lfloor \; \rfloor$ represents an integer part and a range of θ is (−∞, +∞).

In the preferred embodiment, the transformed beam can extract more phase excursion from the orbital angular momentum mode of photons to be measured so that the focused light spot is less broadened, which can effectively overcome the crosstalk problem due to the partial overlap between adjacent modes in the original log-polar transformation solution.

In a preferred embodiment, the first phase modulation Q(x, y) is expressed as:

$$Q(x, y) = \frac{k\beta}{d(a^2+1)}\left[(ax+y)\ln\left(\frac{r}{r_0}\right) + (x-ay)\theta - (ax+y)\right] - \frac{kr^2}{d}$$

where k is a wave number of the incident vortex beam and d is a distance between the phase plate 1 and the phase plate 2.

In a preferred embodiment, the second phase modulation P(u, v) is expressed by the following formula:

$$P(u,v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}$$

Compared with the prior art, the technical solution of the present invention has the following beneficial effects:

1. Since the spiral transformation can naturally extract more phase excursion from the orbital angular momentum mode of photons than the log-polar transformation to improve the isolation between adjacent modes, it fundamentally overcomes the crosstalk problem between adjacent modes inherent in the log-polar transformation solution.

2. Due to the various forms of spirals, there are different kinds of spiral transformations available, which can greatly promote the existing log-polar transformation solution and have greater flexibility in practical applications, thus having greater application potential.

DRAWINGS

DETAILED IMPLEMENTATION

The drawings are for illustrative purposes only and are not to be construed as limiting the invention.

In order to better illustrate the embodiment, some components of the drawings may be omitted, enlarged or reduced, and do not represent the actual product size.

It will be apparent to those skilled in the art that certain known structures and their description may be omitted.

The technical solution of the present invention will be further described below with reference to the accompanying drawings and embodiments.

Figure 2:
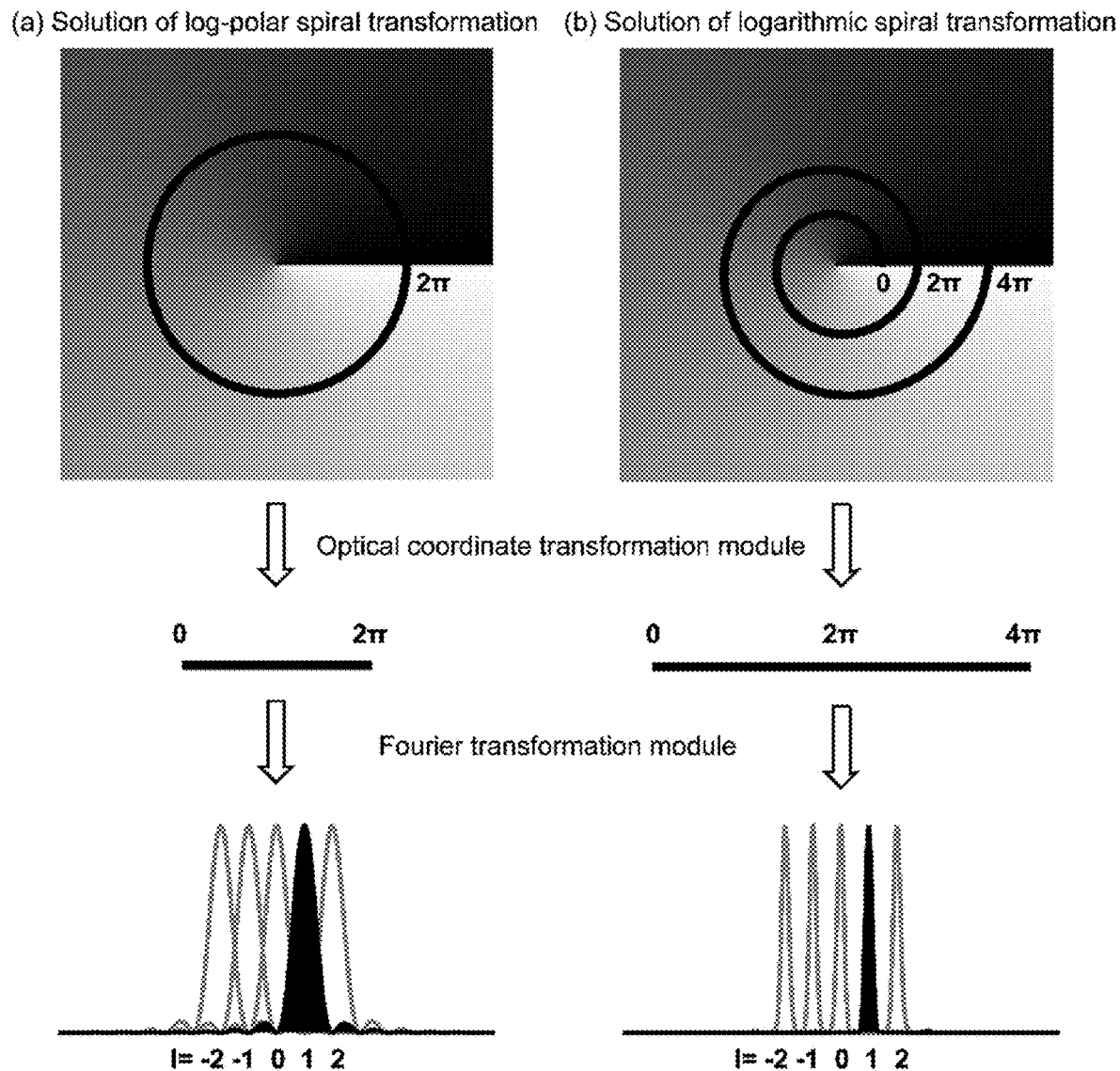
FIG. 2 is a schematic diagram showing the principle and system configuration of OAM mode of photons sorting based on optical coordinate transformation in the embodiment.
Figure 3:
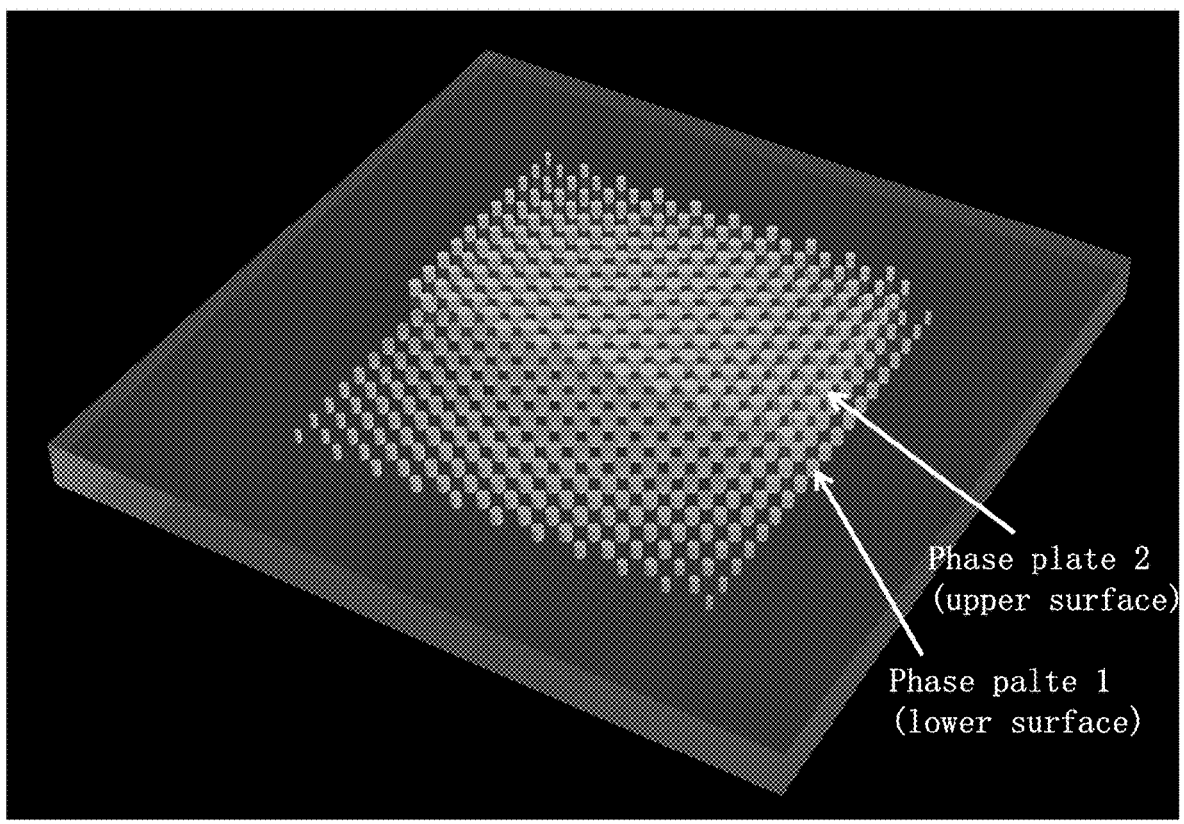
FIG. 3 is a schematic view of the integration of two phase plates into the two opposite surfaces of the same substrate in the embodiment.

A system for measuring orbital angular momentum modes of photons based on spiral transformation is constituted by an optical coordinate transformation module, a Fourier transformation module and a light intensity detection module, as shown in FIG. 2. The most critical optical coordinate transformation module is constituted by two phase plates having phase modulation function on beam (i.e., phase plate 1 and phase plate 2). The phase plate can be a common spatial light modulator, diffractive optical element and metasurface, etc. In order to make it as simple and easy to use as possible, this embodiment integrates two phase plates required for implementing the spiral transformation onto the two opposite surfaces of the same substrate, as shown in FIG. 3, so that precise alignment of the two phase plates is achieved during the production process. The Fourier transform module is constituted by a convex lens, and the beam at the front focal plane and the back focal plane of the lens satisfies the Fourier transformation relationship. The light intensity detection module can be constituted of a camera or an optical fiber array, by taking an image or coupling into different optical fibers to obtain the information of light intensity distribution.

The planes where the two phase plates on the lower and upper surfaces of the substrate in the optical coordinate transformation module are located are respectively defined as (x, y) and (u, v), with a distance of d in between corresponding to the thickness of the substrate; the convex lens of the Fourier transformation module are placed in parallel behind the phase plate 2, which satisfies that the plane where the phase plate 2 is located corresponds to the front focal plane of the lens, and the plane where the light intensity detection module is located corresponds to the back focal plane of the lens.

Figure 1:
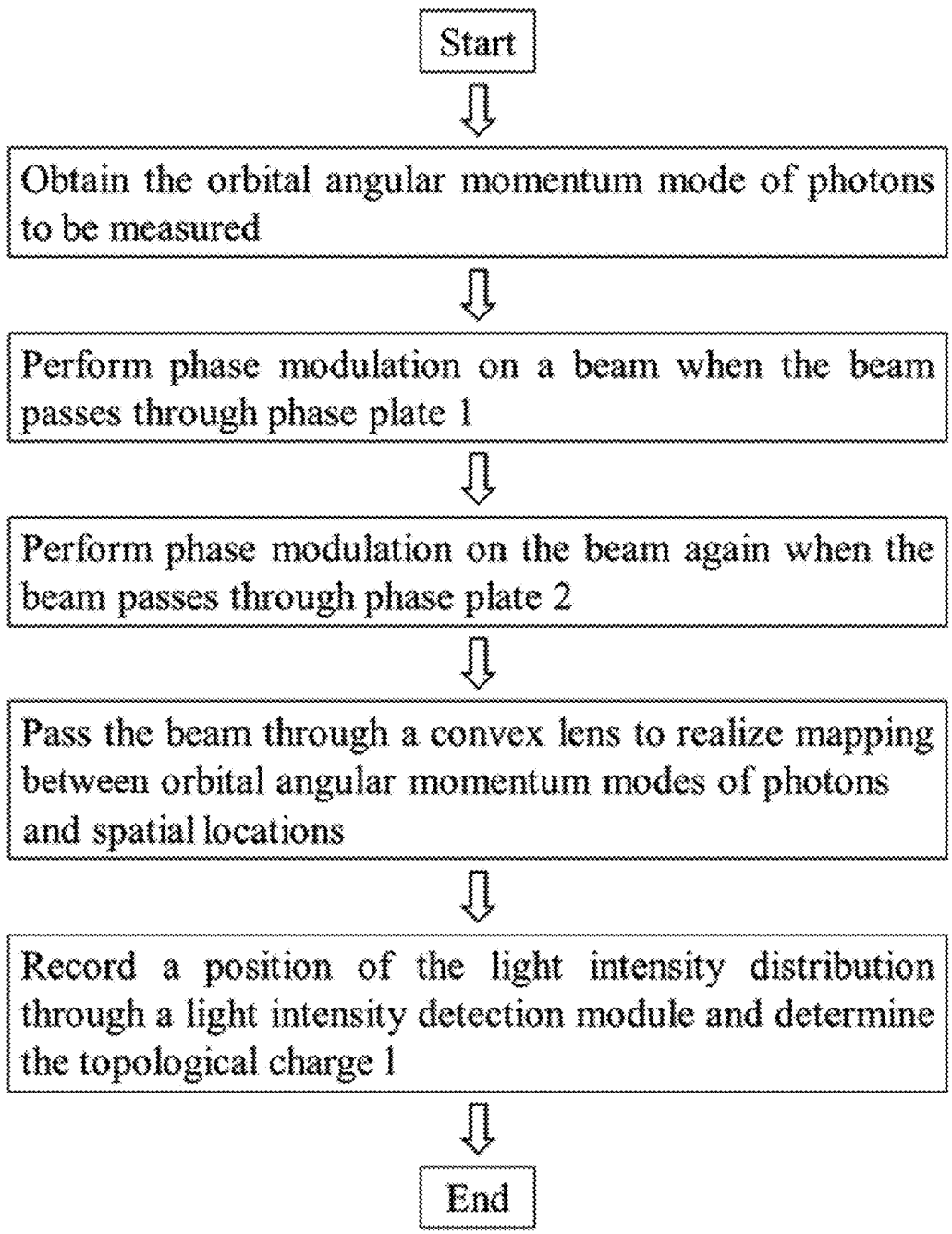
FIG. 1 is a flow chart of an embodiment.

As shown in FIG. 1, a method for measuring orbital angular momentum modes of photons includes the following steps:

Step 1: Obtain the orbital angular momentum mode of photons to be measured, a wavefront of a corresponding vortex beam has a specific angular spiral phase exp(ilθ) with l to be the topological charge and θ to be the azimuthal angle. This embodiment will be described as a measurement of the orbital angular momentum mode of photons of l=1 for illustration. The beam to be measured is vertically incident on the phase plate 1 in the optical coordinate transformation module, and the center of the beam is aligned with the center of the phase plate pattern.

Step 2: The beam to be measured incident on the optical coordinate transformation module, through the phase modulation Q(x, y) of the phase plate 1 and P(u, v) of the phase plate 2 in sequence, realizes spiral coordinate transformation, that is, $$Q(x, y) = \frac{k\beta}{d(a^2+1)}\left[(ax+y)\ln\left(\frac{r}{r_0}\right) + (x-ay)\theta - (ax+y)\right] - \frac{kr^2}{d}$$

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}$$

where k is the wave number of the incident beam propagating inside the substrate, a and $r_0$ are the parameters of the logarithmic spiral transformation to be determined, in which $r_0$ represents the position information in the plane (x, y) mapped to the origin of the plane (u, v), and a represents the growth rate of the logarithmic spiral; a=0 corresponds to the case that the logarithmic spiral transformation deteriorates into the log-polar transformation; and (r, θ) are the spiral-polar coordinates of the plane (x, y), that is, $$r = (x^2+y^2)^{\frac{1}{2}}, \theta = \theta_0 + 2m\pi, \theta_0 = \tan^{-1}\left(\frac{y}{x}\right), m = \left\lfloor\frac{1}{2\pi a}\ln\left(\frac{r}{r_0}e^{-2a\theta_0}\right)\right\rfloor$$

where ⌊ ⌋ represents the integer part and the range of θ is (−∞, +∞).

After the spiral transformation performed by this module, the intensity distribution of the incident beam in the original plane (x, y) is transformed from a ring-shape distribution into a transverse rectangular distribution in the plane (u, v), and the phase distribution is also transformed from a spiral phase exp(ilθ) into a transverse linear phase $$\exp\left(\frac{ilv}{\beta}\right)$$

accordingly. In the case of l=1, the transverse linear phase is $$\exp\left(\frac{ilv}{\beta}\right),$$

which corresponds to a plane wave mode with a specific tilted angle.

Step 3: The transformed beam with a specific tilted wavefront $$\exp\left(\frac{ilv}{\beta}\right)$$

is incident on a convex lens (with a focal length of f) as the Fourier transformation module, and then will be focused to a specific transverse position $$m = \frac{\lambda f}{2\pi\beta}\cdot l$$

on the back focal plane (m, n), where λ is the wavelength of the light wave, thereby realizing one-to-one mapping between different orbital angular momentum modes of photons and spatial locations. For the case of l=1, the beam will be focused to a transverse position of $$m = \frac{\lambda f}{2\pi\beta}.$$

Step 4: Using the light intensity detection module located on the back focal plane of the lens, the topological charge of the orbital angular momentum mode of photons can be determined as l=1 through the position $$m = \frac{\lambda f}{2\pi\beta}$$

of the light intensity distribution measured by the light intensity detection module.

The terms used to describe the positional relationship in the drawings are for illustrative purposes only and are not to be construed as limiting the invention;

It is apparent that the above-described embodiments of the present invention are merely illustrative of the present invention and are not intended to limit the embodiments of the present invention. Other variations or modifications of the various forms may be made by those skilled in the art in light of the above description. There is no need and no way to enumerate all of the implementations. Any modifications, equivalent substitutions and improvements made within the spirit and principle of the invention are intended to be included within the scope of the appended claims.

What is claimed:

1. A method for measuring orbital angular momentum modes of photons based on spiral transformation, wherein the method includes the following steps:

S1: incidenting an incident vortex beam carrying orbital angular momentum of photons to be measured on a first phase plate located in a plane (x, y) vertically, and a center of the beam to be measured aligning with a center of the phase plate, wherein a wavefront of the incident vortex beam is an angular spiral phase distribution exp(ilθ), where l is a topological charge, θ is an azimuthal angle, and i is an imaginary unit;

S2: loading a predetermined first phase modulation Q(x, y) on the first phase plate located in the plane (x, y) so that the incident vortex beam propagates to a second phase plate located in a plane (u, v) after being modulated by the first phase plate;

S3: loading a predetermined second phase modulation P(u, v) on the second phase plate located in the plane (u, v), so that a phase distribution of the incident vortex beam is transformed from the angular spiral phase exp(ilθ) into a transverse linear phase $$\exp\left(\frac{ilv}{\beta}\right),$$

where is a scaling factor;

S4: passing the incident vortex beam after the second phase modulation P(u, v) through a convex lens, wherein due to the transverse linear phase after transformation, the incident vortex beam will be focused into a transverse position m in a back focal plane of the convex lens, and the beam in a front focal plane and the back focal plane satisfies Fourier transformation relationship so that m is expressed by the following formula:

$$m = \frac{\lambda f}{2\pi \beta} \cdot l$$

where $\lambda$ is a wavelength of a light wave and f is a focal length of the convex lens;

S5: recording a position of the light intensity distribution through a light intensity detection module in the back focal plane of the lens and determining the topological charge/of the orbital angular momentum mode of photons of the beam to be measured.

2. The method for measuring orbital angular momentum modes of photons according to claim 1, wherein the beam in the plane (x, y) in S2 is decomposed along a path of a logarithmic spiral and mapped to a straight line in the plane (u, v); a corresponding mapping relationship of coordinates is expressed by the following formula:

$$u(r, \theta) = \frac{\beta}{1+a^2}\left[a \cdot \ln\left(\frac{r}{r_0}\right) + \theta\right], \; v(r, \theta) = \frac{\beta}{1+a^2}\left[\ln\left(\frac{r}{r_0}\right) - a \cdot \theta\right]$$

where a and $r_0$ are related parameters of a logarithmic spiral transformation, in which $r_0$ represents a position information in the plane (x, y) mapped to an origin of the plane (u, v); a represents a growth rate of the logarithmic spiral, a=0 corresponds to a case that the logarithmic spiral transformation deteriorates into a log-polar transformation; and (r, θ) are a spiral-polar coordinates of the plane (x, y).

3. The method for measuring orbital angular momentum modes of photons according to claim 2, wherein (r, θ) is expressed by the following formula:

$$r = (x^2+y^2)^{\frac{1}{2}}, \; \theta = \theta_0 + 2m\pi, \; \theta_0 = \tan^{-1}\left(\frac{y}{x}\right), \; m = \left\lfloor \frac{1}{2\pi a}\ln\left(\frac{r}{r_0}e^{-a\theta_0}\right) \right\rfloor$$

where $\lfloor\;\rfloor$ represents an integer part and a range of θ is (−∞, +∞).

4. The method for measuring orbital angular momentum modes of photons according to claim 1, wherein the first phase modulation Q(x, y) is expressed by the following formula:

$$Q(x, y) = \frac{k\beta}{d(a^2+1)}\left[(ax+y)\ln\left(\frac{r}{r_0}\right) + (x-ay)\theta - (ax-y)\right] - \frac{kr^2}{d}$$

where k is a wave number of the incident vortex beam propagating between the first phase plate and the second phase plate; d is a distance between the first phase plate and the second phase plate; a and $r_0$ are related parameters of a logarithmic spiral transformation, in which $r_0$ represents a position information in the plane (x, y) mapped to an origin of the plane (u, v), and a represents a growth rate of a logarithmic spiral; a=0 corresponds to a case that the logarithmic spiral transformation deteriorates into a log-polar transformation.

5. The method for measuring orbital angular momentum modes of photons according to claim 4, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}.$$

6. The method for measuring orbital angular momentum modes of photons according to claim 1, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}$$

where k is a wave number of the incident vortex beam propagating between the first phase plate and the second phase plate; d is the distance between the first phase plate and the second phase plate; a and $r_0$ are related parameters of a logarithmic spiral transformation, in which $r_0$ represents the position information in the plane (x, y) mapped to an origin of the plane (u, v), and a represents a growth rate of the logarithmic spiral; a=0 corresponds to a case that the logarithmic spiral transformation deteriorates into a log-polar transformation.

7. A system for measuring orbital angular momentum modes of photons based on spiral transformation applying the method for measuring orbital angular momentum modes of photons based on spiral transformation according to claim 1, wherein the system includes an optical coordinate transformation module, a Fourier transformation module and a light intensity detection module, wherein the optical coordinate transformation module includes two phase plates having a beam phase modulation function, and the two phase are defined as a first phase plate and a second phase plate, respectively;

the Fourier transformation module includes a convex lens, of which a beam at a front focal plane and a back focal plane satisfies a Fourier transformation relationship;

the light intensity detection module is used to acquire information of light intensity distribution.

8. The system for measuring orbital angular momentum modes of photons based on spiral transformation according to claim 7, wherein the two phase plates are located on two opposite surfaces of a substrate having a thickness of d, and the two opposite surfaces of substrate are defined as a plane (x, y) for the first phase plate and a plane (u, v) for the second phase plate, respectively; the convex lens of the Fourier transformation module and the plane (u, v) of the second phase plate are parallel to each other; the plane (u, v) of the second phase plate corresponds to the front focal plane of the convex lens; a plane where the light intensity detection module is located corresponds to the back focal plane of the convex lens.

9. The method for measuring orbital angular momentum modes of photons according to claim 2, wherein the first phase modulation Q(x, y) is expressed by the following formula:

$$Q(x, y) = \frac{k\beta}{d(a^2+1)}\left[(ax+y)\ln\left(\frac{r}{r_0}\right) + (x-ay)\theta - (ax-y)\right] - \frac{kr^2}{d}$$

where k is a wave number of the incident vortex beam propagating between the first phase plate and the second phase plate; d is a distance between the first phase plate and the second phase plate; a and $r_0$ are related parameters of a logarithmic spiral transformation, in which $r_0$ represents a position information in the plane (x, y) mapped to an origin of the plane (u, v), and a represents a growth rate of a logarithmic spiral; a=0 corresponds to a case that the logarithmic spiral transformation deteriorates into a log-polar transformation.

10. The method for measuring orbital angular momentum modes of photons according to claim 9, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}.$$

11. The method for measuring orbital angular momentum modes of photons according to claim 3, wherein the first phase modulation Q(x, y) is expressed by the following formula:

$$Q(x, y) = \frac{k\beta}{d(a^2+1)}\left[(ax+y)\ln\left(\frac{r}{r_0}\right) + (x-ay)\theta - (ax-y)\right] - \frac{kr^2}{d}$$

where k is a wave number of the incident vortex beam propagating between the first phase plate and the second phase plate; d is a distance between the first phase plate and the second phase plate; a and $r_0$ are related parameters of a logarithmic spiral transformation, in which $r_0$ represents a position information in the plane (x, y) mapped to an origin of the plane (u, v), and a represents a growth rate of a logarithmic spiral; a=0 corresponds to a case that the logarithmic spiral transformation deteriorates into a log-polar transformation.

12. The method for measuring orbital angular momentum modes of photons according to claim 11, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}.$$

13. The method for measuring orbital angular momentum modes of photons according to claim 2, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}$$

where k is a wave number of the incident vortex beam propagating between the first phase plate and the second phase plate; d is the distance between the first phase plate and the second phase plate; a and $r_0$ are related parameters of a logarithmic spiral transformation, in which $r_0$ represents the position information in the plane (x, y) mapped to an origin of the plane (u, v), and a represents a growth rate of the logarithmic spiral; a=0 corresponds to a case that the logarithmic spiral transformation deteriorates into a log-polar transformation.

14. The method for measuring orbital angular momentum modes of photons according to claim 3, wherein the second phase modulation P(u, v) is expressed by the following formula:

$$P(u, v) = \frac{kr_0}{d}\frac{\beta}{1+a^2}\exp\left(\frac{au+v}{\beta}\right) \times \left[\sin\left(\frac{u-av}{\beta}\right) + a\cdot\cos\left(\frac{u-av}{\beta}\right)\right] - \frac{k(u^2+v^2)}{2d}$$

where k is a wave number of the incident vortex beam propagating between the first phase plate and the second phase plate; d is the distance between the first phase plate and the second phase plate; a and $r_0$ are related parameters of a logarithmic spiral transformation, in which $r_0$ represents the position information in the plane (x, y) mapped to an origin of the plane (u, v), and a represents a growth rate of the logarithmic spiral; a=0 corresponds to a case that the logarithmic spiral transformation deteriorates into a log-polar transformation.

* * * * *